Aug. 2, 1927.                                                        1,637,881
R. O. STILWELL ET AL
PROCESS OF AND APPARATUS FOR MAKING SHEET GLASS
Filed Aug. 6, 1925                    3 Sheets-Sheet 1
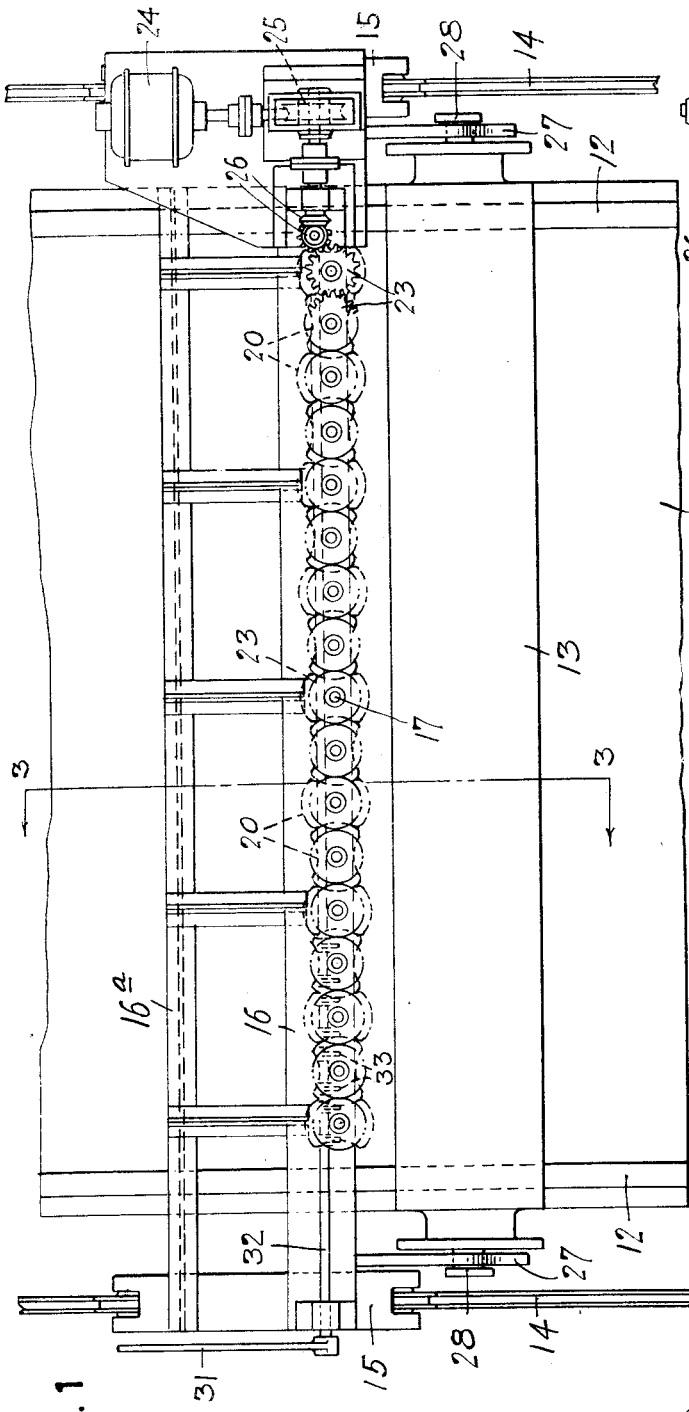
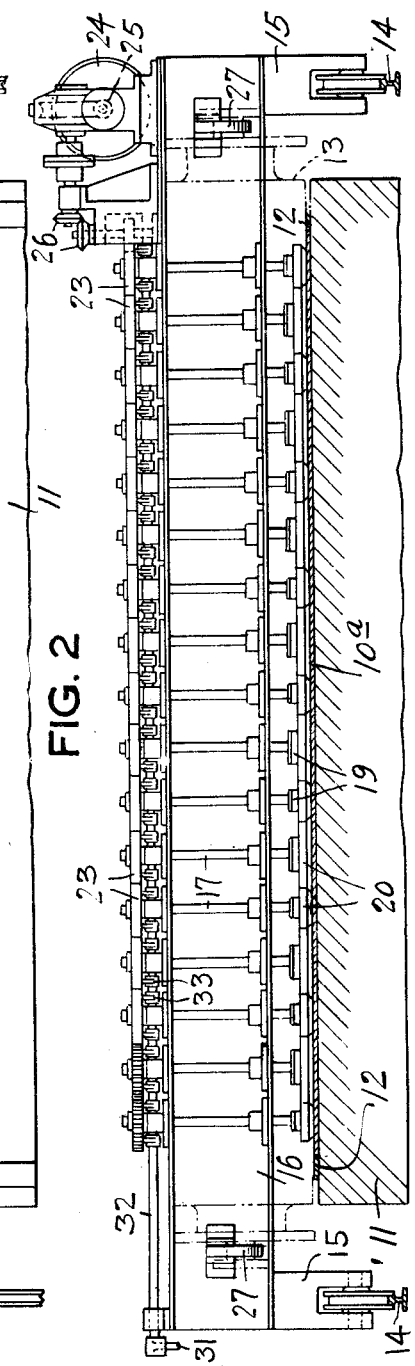
INVENTORS
Richard O. Stilwell.
Charles H. Christie
By Kay, Totten & Martin,
Attorneys.

Aug. 2, 1927.  1,637,881
R. O. STILWELL ET AL
PROCESS OF AND APPARATUS FOR MAKING SHEET GLASS
Filed Aug. 6, 1925  3 Sheets-Sheet 2
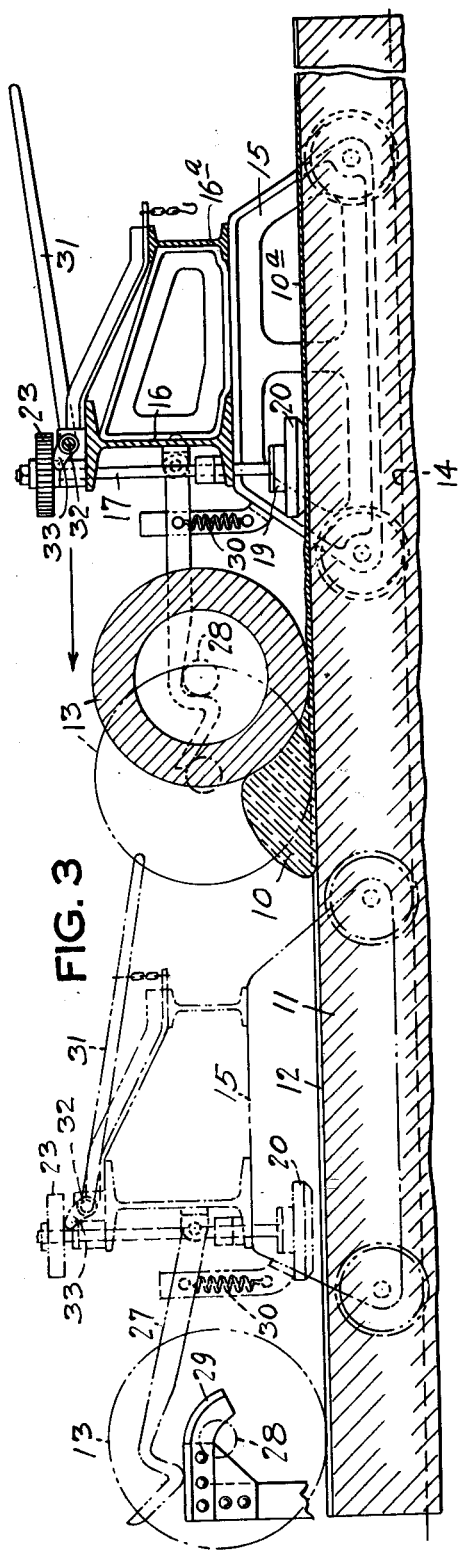
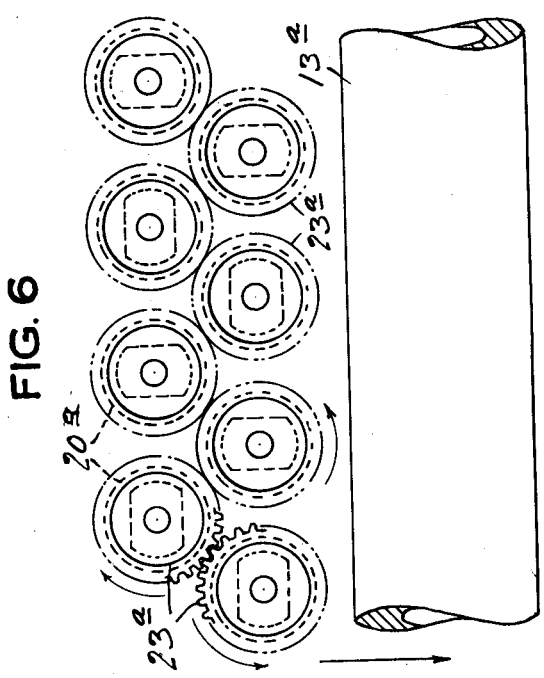
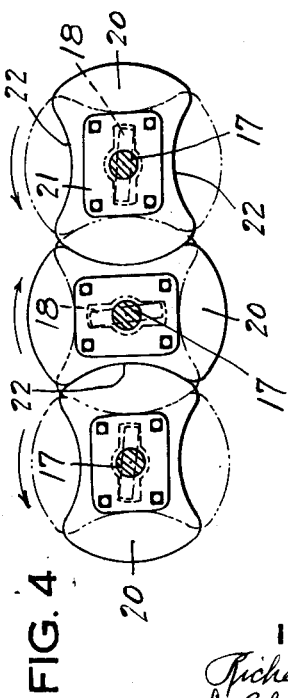
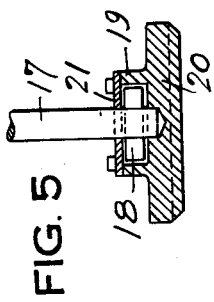
INVENTORS
Richard O. Stilwell
& Charles H. Christie
By Kay, Totten & Martin,
   Attorneys

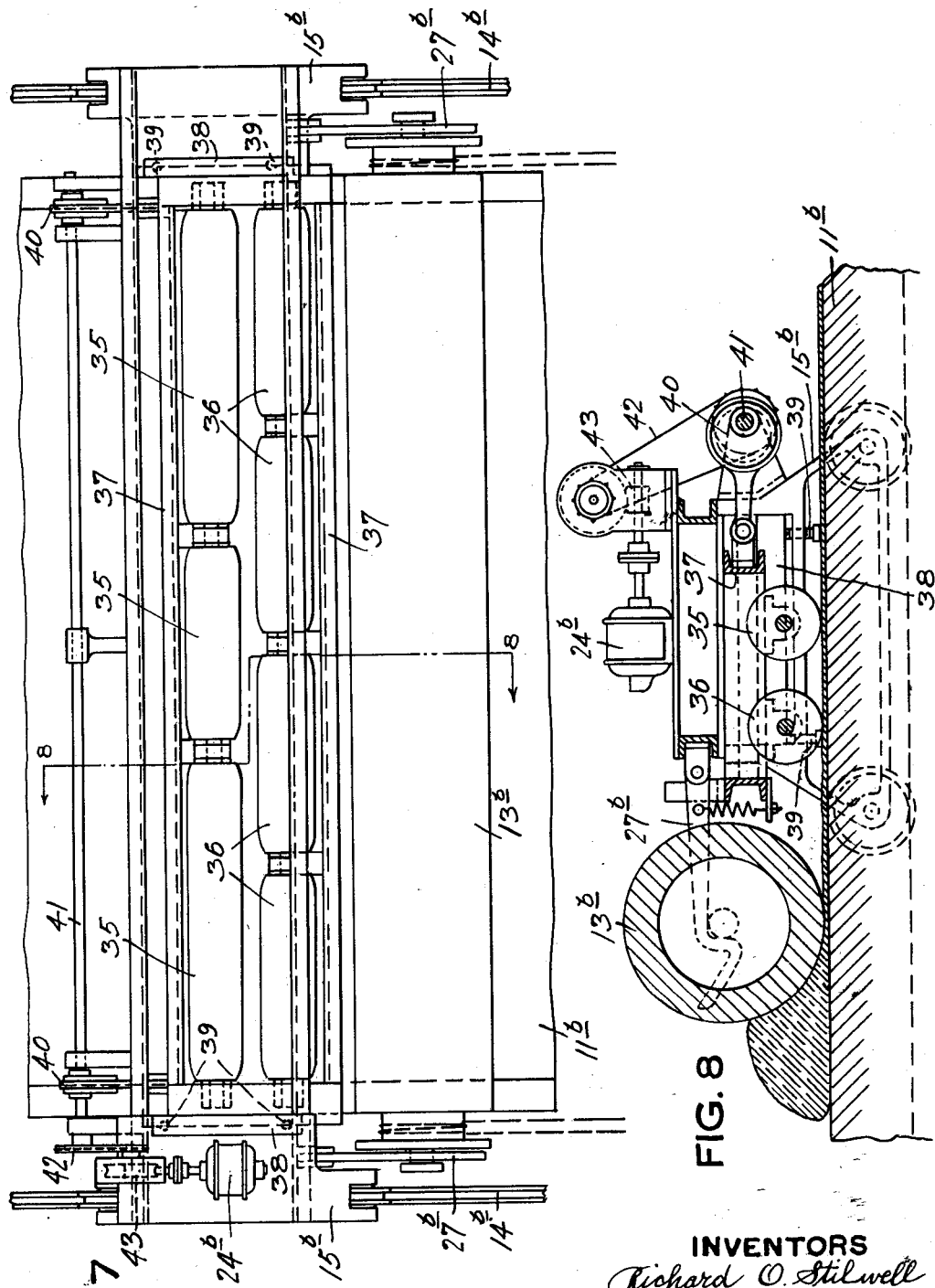

Patented Aug. 2, 1927.

1,637,881

UNITED STATES PATENT OFFICE.

RICHARD O. STILWELL AND CHARLES H. CHRISTIE, OF BUTLER, PENNSYLVANIA, ASSIGNORS TO STANDARD PLATE GLASS COMPANY, OF BUTLER, PENNSYLVANIA, A CORPORATION OF PENNSYLVANIA.

PROCESS OF AND APPARATUS FOR MAKING SHEET GLASS.

Application filed August 6, 1925. Serial No. 48,457.

Our invention relates to a process of and apparatus for making sheet glass, and particularly to the step of rolling and smoothing the same upon a casting table or the like.

Plate glass is commonly formed by pouring a molten mass of glass upon a casting table and rolling it out by means of a large roller. Wave-like lines or ridges are often found in sheets of glass so formed, owing to the action of the roller, and the sheet sometimes warps. The glass is then ground upon both sides, in order to make its surfaces perfectly flat. The removal of the protuberances involves considerable time and expense. Attempts have been heretofore made to smooth and flatten the glass after the forming roll has distributed it upon the table, but so far as we are aware, such attempts have been unsuccessful.

One object of our invention is to provide a means and a method for smoothing a sheet of glass directly following the formation thereof, or when heated to such temperature that it is in a plastic or semi-molten condition.

Another object of our invention is to simplify and improve generally the means and methods by which sheet glass is formed.

Some of the different ways in which our invention may be practiced are shown in the accompanying drawing wherein Fig. 1 is a plan view of a portion of a casting table, showing a sheet-forming roll and one form of our smoothing apparatus; Fig. 2 is an elevational view of the apparatus of Fig. 1 with the sheet-forming roll removed; Fig. 3 is a view taken on the line 3—3 of Fig. 1; Fig. 4 is a plan view, on an enlarged scale, of some of the smoothing members shown in Fig. 1; Fig. 5 is a vertical sectional view of one of the smoothing members of Fig. 4; Fig. 6 is a schematic plan view showing a modified form and arrangement of glass smoothing members; Fig. 7 is a plan view of a portion of a casting table, showing still another form of smoothing apparatus, and Fig. 8 is a cross sectional view of the apparatus of Fig. 7.

Our invention may be practiced in connection with casting tables of somewhat the usual type, wherein a mass of molten glass 10 is deposited upon a table 11 which is provided with marginal ribs or bars 12 that serve as tracks for a glass forming roll 13, the glass being deposited between these ribs and formed into a sheet 10ª by the advancing roll, as shown in Fig. 3.

Our invention has to do with the elimination of irregularities in a sheet of glass after the roll 13 has formed the same. Apparatus for accomplishing this smoothing or ironing effect will now be described.

At each side of the table 11, a track rail 14 is provided for supporting a truck 15 composed of side frames that are connected by I-beams 16 and 16ª. The I-beams 16 and 16ª extend across the table, their opposite ends being supported by the truck side frames at a suitable height above the plane of the table.

As shown more clearly in Fig. 3, the I-beam 16 serves as a support for the bearings of a plurality of vertically disposed shafts 17 that are mounted in side-by-side relation in a direction transversely of the table. The shafts 17 are provided with keys or pins 18 at their lower ends that fit into recessed bosses 19 which are formed upon the upper side of shoes or irons 20. Plates 21 are secured to the bosses 19 and hold shoes 20 in assembled position upon the shafts 17.

Each shoe 20 is provided with curved recesses 22 at diametrically spaced points, into which the peripheral portion of adjacent shoes may fit, as shown in Fig. 4. Adjacent shoes 20 are circumferentially offset at a distance of 90° with respect to one another, so that as the shoes are rotated the entire surface of a sheet of glass across which the group of shoes moves as a unit will be acted upon and there will be no untouched surfaces on the glass, as would be the case if the shoes were made truly circular and mounted in edge to edge relation.

For the purpose of rotating the shoes 20, we secure a gear wheel 23 to the upper end of each of the shafts 17. The gear wheels 23 are of such diameter that they interengage with one another, as shown in Figs. 1 and 2. A motor 24 is mounted upon the truck frame 15 and has driving connection with the gear wheels 23, through a worm drive 25 and bevel gears wheels 26, so that when the motor is energized all of the shoes 20 will be rotated.

The truck 15 is connected to the forming roll 13 by hooked levers 27 each of which is pivoted at one of its ends to the truck 15 and at the other end hooks over an axial extension 28 of the roll 13.

As the roll is advanced, through any suitable means, to form the glass, the truck is drawn along, the motor 24 meantime rotating the shoes 20 about their various axes. When the roll and the truck have advanced from their position shown in full lines in Fig. 3 to that shown in dotted lines therein, the truck is automatically disconnected from the roll 13 by means of stationary cams 29 against which the noses of the coupling levers 27 engage, to lift such levers out of engagement with the roll 13 and against the tension of springs 30 that tend to hold the levers in their lowermost positions.

The roll 13 may then be removed from the table or permitted to remain in the position shown until it is required for another glass forming operation. The truck 15 is withdrawn to permit removal of the sheet of glass. Preliminary to withdrawal of the truck, the shoes 20 are raised out of contact with the glass by means of a lever 31 which is connected to a rock shaft 32 that in turn carries a plurality of camming arms 33, each of which engages the underside of one of the gear wheels 23. The shafts 17 have sliding movement in their bearings, so that when the lever 31, as shown in Fig. 3, is operated in a clockwise direction, the shafts are elevated, carrying the shoes 20 out of engagement with the glass. The truck 15 can then be returned to its starting position without danger of injury to the sheet of glass.

In Fig. 6 we have shown, somewhat diagrammatically, a different arrangement of ironing shoes 20ᵃ. These shoes function substantially the same as shoes 20 but are of circular form instead of having segmental recesses. The shoes 20ᵃ are arranged in two rows that are offset with relation to one another so that no portion of the surface of the glass will be left untouched as the shoes are moved across it behind the roll 13ᵃ. The shoes 20ᵃ may be driven by gear wheels 23ᵃ, adjacent ones of which mesh with one another as in the case of the gear wheels 23, and may be carried by a truck frame such as that of truck 15.

In Figs. 7 we have shown still another form of ironing or smoothing mechanism. In this structure the truck 15ᵇ is moved along track 14ᵇ and carries a motor 24ᵇ. A plurality of ironing rolls 35 and 36 are mounted upon the truck 15ᵇ for contact with the sheet of glass. The truck 15ᵇ is detachably connected to the glass forming roll 13ᵇ by arms 27ᵇ. The smoothing rolls 35 and 36 are mounted in overlapping relation as shown in Fig. 1, so as to subject every portion of the sheet of glass to a smoothing operation. In order to secure a proper smoothing or iron action by rolls 35 and 36, we journal said rolls in a frame 37 that is slidably supported upon a pair of blocks 38 which are adjustable vertically of the truck by means of adjusting screws 39, to give the desired clearance between the rollers 35 and 36 and the surface of the table 11ᵇ. The frame 37 is oscillated by means of eccentrics 40 which are operated by a cam shaft 41 that has driving connection, through a sprocket and sprocket chain 42 and a worm drive 43, with the motor 24ᵇ.

As the roll 13ᵇ is advanced along the table, drawing with it the truck 15ᵇ and the smoothing rolls 35 and 36, the motor 24ᵇ will be actuated to reciprocate the smoothing rolls in a direction parallel to the path of travel of the carriage. An ironing effect would also be produced were the rolls 35 and 36 to be reciprocated in a direction parallel to their axes. It appears to be necessary, in order to secure the best results, to provide movement other than simply forward rotary movement to the smoothing rolls.

By ironing or smoothing the glass at a short distance behind the sheet-forming roll, such glass is usually found to be of the proper consistency. That is, it is not so nearly fluid as to deform after the ironing shoes have passed over it, by warping or otherwise, nor is it so greatly chilled that the shoes cannot properly flatten and smooth the same. It will be understood that the glass need not be ironed during the sheet-forming operation, but that it is only necessary for a sheet of glass to be brought, in some manner, to the desired temperature for smoothing. Temperatures suitable for ironing may range from 1,400° F. to 1,800° F.

We claim as our invention:

1. The method of smoothing plate glass, which comprises forming a sheet of glass by rolling a mass of plastic glass, advancing a smoothing member across the surface of said sheet while still plastic, and simultaneously rotating said member independently of its advancing movement.

2. Sheet glass forming apparatus comprising a forming roll adapted to roll out a mass of plastic glass, an ironing block, means for advancing said ironing block across the sheet of glass as said sheet is being formed by said roll, and means for rotating said block independently of its advancing movement.

3. Sheet glass forming apparatus comprising a forming roll adapted to roll out a mass of plastic glass, an ironing block, means for advancing said ironing block across the surface of the glass as it is being formed by said roll, in a direction parallel to the path of movement of said roll, and means for simultaneously imparting movement to said ironing block in another direction.

4. Sheet glass forming apparatus comprising an ironing member adapted to engage a sheet of plastic glass to flatten the same, means for advancing said ironing member in one general direction, and means for simultaneously imparting movement to said member in a direction different from said first named direction of movement.

5. Glass forming apparatus comprising a forming roll, means for advancing said roll across a mass of plastic glass to flatten the same, an ironing member mounted at a predetermined distance to the rear of said roll, means for advancing said ironing member as the roll advances, and means for rotating said ironing member independently of its advancing movement.

6. Glass forming apparatus comprising a forming roll, means for advancing said roll across a mass of plastic glass to flatten the same, an ironing member mounted at a predetermined distance to the rear of said roll, means for advancing said ironing member as the roll advances, and means for imparting movement to said ironing member in a direction different from that in which the forming roll is advanced.

7. The combination with a glass casting table and a sheet forming roll, mounted for movement across said table, of glass smoothing mechanism comprising a traveling carrier, an ironing member mounted on said carrier in position to engage the sheet of glass, and means for imparting movement to said ironing member relative to said carrier.

8. Glass smoothing apparatus comprising a carrier adapted to move in a path adjacent to a sheet of glass, and a series of ironing members mounted on said carrier and disposed transversely of the sheet of glass.

9. Glass smoothing apparatus comprising a carrier adapted to move in a path adjacent to a sheet of glass, and a series of ironing members mounted on said carrier and disposed transversely of the sheet of glass, the said ironing members being mounted in overlapping relation as viewed horizontally.

10. Smoothing apparatus for use upon sheets of plastic glass comprising a plurality of ironing members disposed transversely of the glass, means for imparting movement to said ironing members as a unit, and means for imparting movement to each ironing member individually.

11. Sheet-glass forming apparatus, comprising a table, a sheet-forming roll movable across said table, a smoothing device, means for connecting said smoothing device to the roll for movement therewith across the table, and means for automatically effecting disconnection of the smoothing device from the roll when the roll has completed its movement across the table.

12. Sheet-glass forming apparatus, comprising a table, a sheet-forming roll movable across the table, a traveling carrier, a support for the carrier at each side of the table, smoothing devices on said carrier, and means for detachably connecting said carrier to the roll.

13. Sheet-glass forming apparatus, comprising a table, a sheet-forming roll having movement across said table, a carrier extending across said table, smoothing devices mounted on said carrier, and rotatable about vertical axis, and means for moving said carrier in predetermined relation to the movement of the roll.

In testimony whereof we, the said RICHARD O. STILWELL and CHARLES H. CHRISTIE have hereunto set our hands.

RICHARD O. STILWELL.
CHARLES H. CHRISTIE.